Patented Apr. 24, 1945

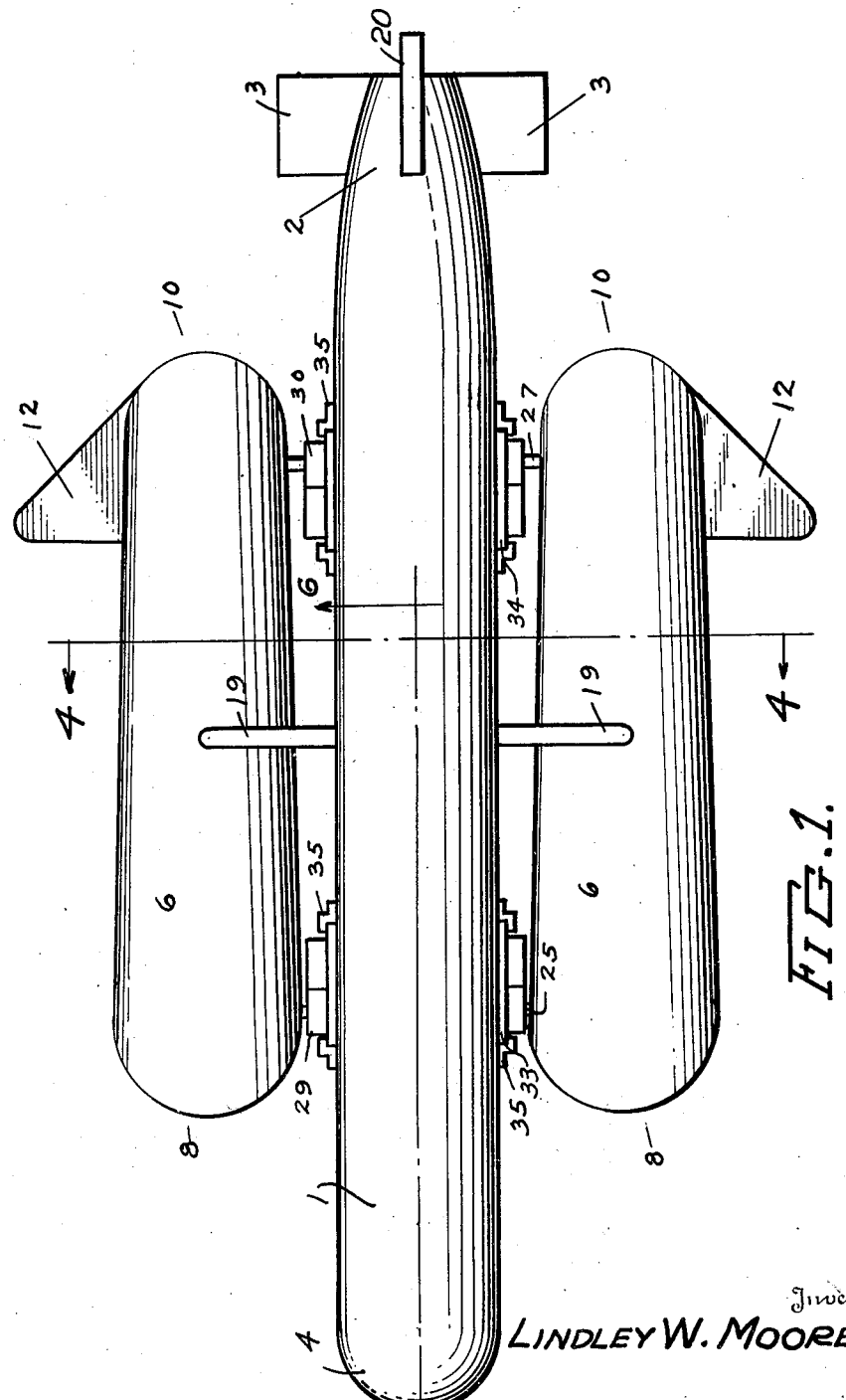

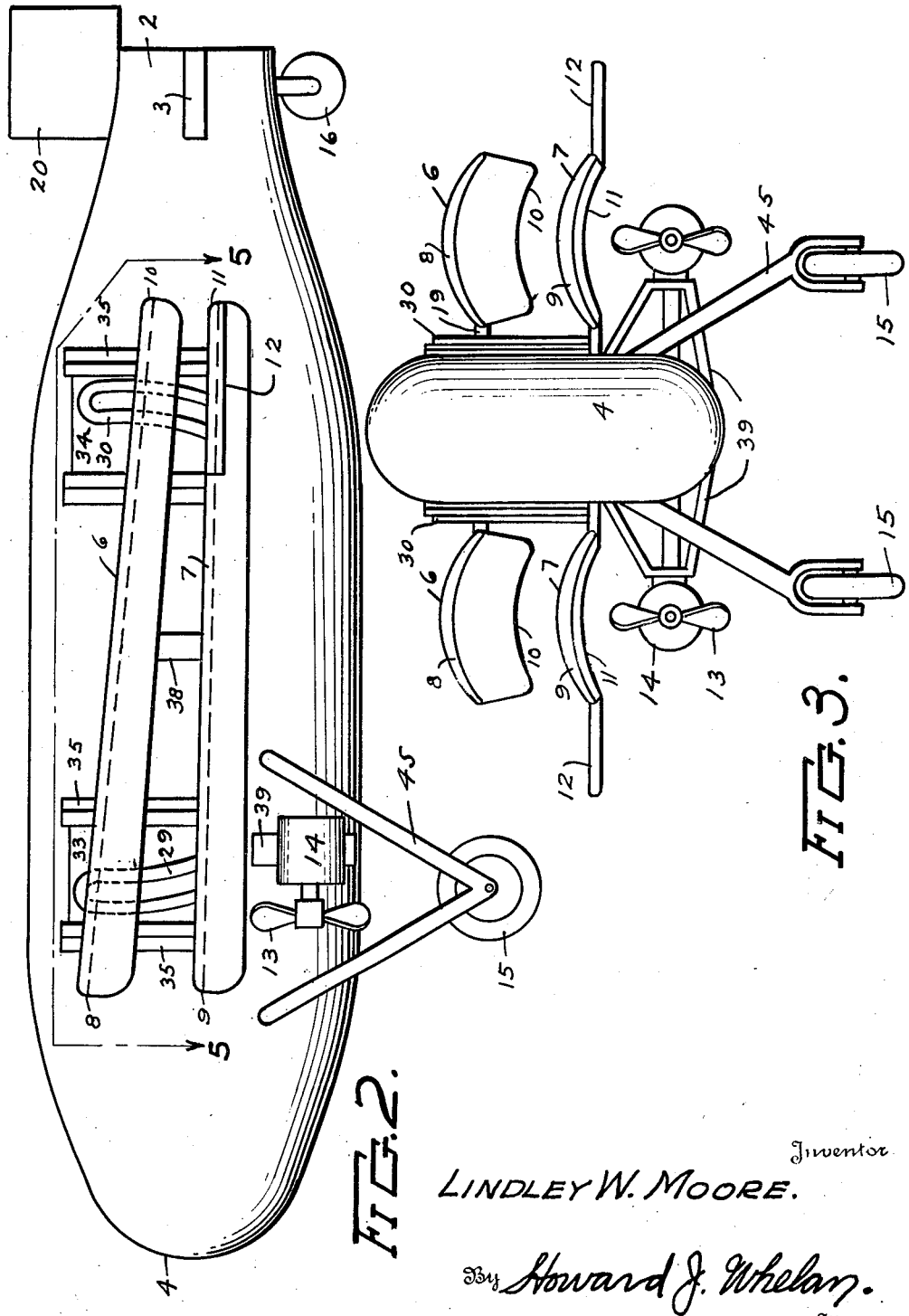

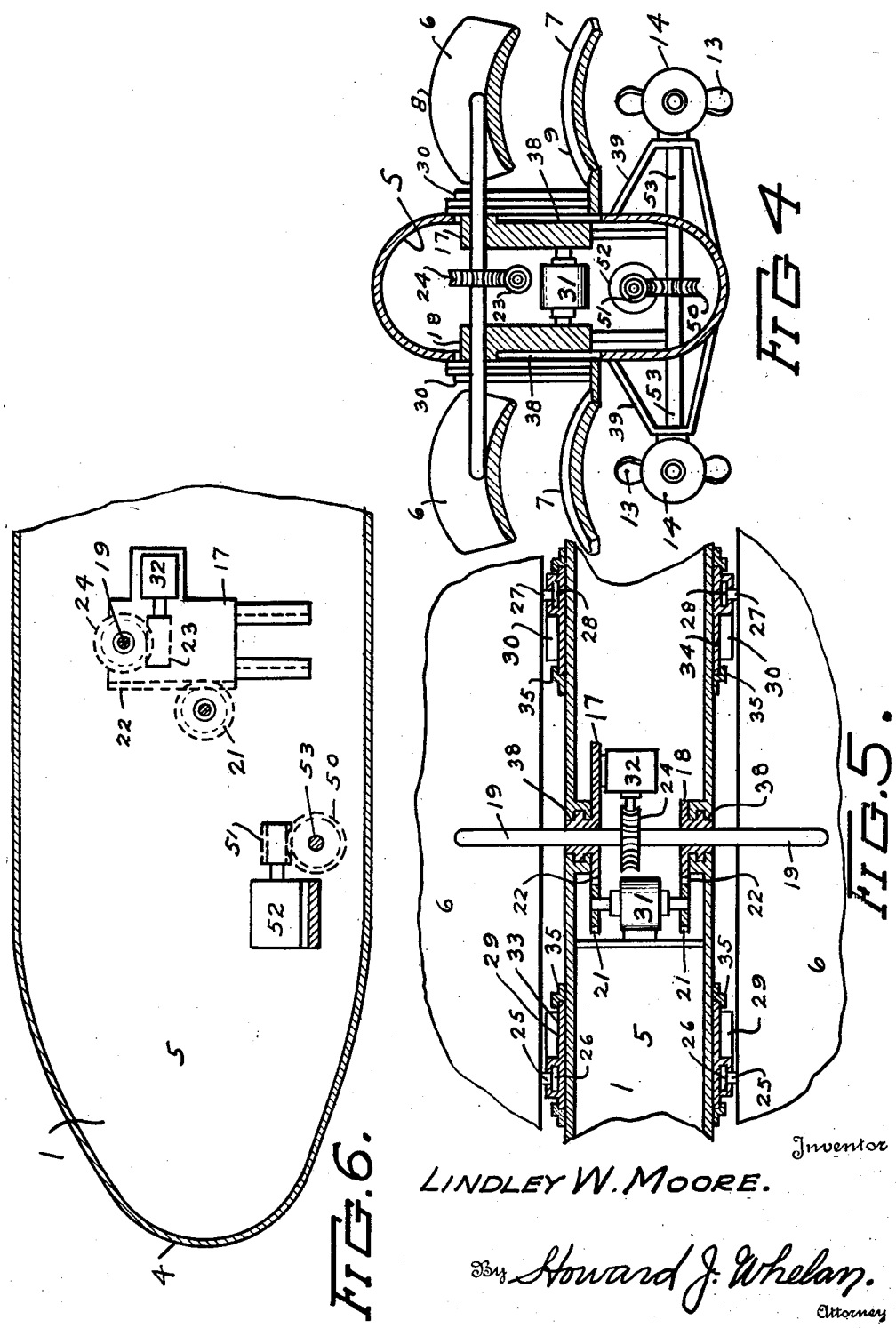

2,374,493

UNITED STATES PATENT OFFICE 2,374,493

AIRPLANE

Lindley W. Moore, Baltimore, Md.

Application October 12, 1942, Serial No. 461,675

2 Claims. (Cl. 244—43)

This invention refers to airplanes and flying machines and more particularly to improvements in the wing construction and the mechanism for operating same. It has among its objects to provide a type of wing structure that will require less area for similar loads than would be used for the conventional types of airplanes. It also has for an object, the use of its wing structure so that it may land and take-off within limited areas. Another object is to have its wing structures arranged for nesting the wings and for various adjustments in positions with regard to each other. A further object is to provide for the angularly varying of the positions of the wings to facilitate landing or taking off within a relatively limited runway. Still another object is to utilize the wing structure to protect the propeller mechanism and position it closer to the effective center of buoyancy of the airplane. A still further object is to have the control of the effective surface of the wings arranged for increasing or decreasing their area and thereby enable the airplane to withstand the severest wind effects due to storms and hurricanes and reduce the hazards that such induce.

Other objects will become apparent as the invention is more fully set forth.

In this type of airplane the wings are made relatively narrow, instead of being laterally extensive as in the conventional type of flying machine. The wings are arranged in superposed pairs, the wings of each pair being adapted to nest with or to be separated from each other. The effective surface area of the wings is increased as they are separated and reduced when nested. The process of adjusting the spacing between the wings produces special effects that serve to control the operation of the airplane and its landing and taking-off. Mechanism is provided for operating the wings and adjusting them to suit the conditions of flying that arise when flying. In case of severe storms and hurricanes the control of the area of effective surface of the wings offers a practical method of overcoming the dangers of the strong winds tending to unbalance its flying capacity, which the conventional wings do not provide for.

In the drawings which illustrated an example of this invention:

Figure 1 is a plan view of an airplane embodying this invention;

Figure 2 is a side elevation of Figure 1;

Figure 3 is a front elevation of Figure 1;

Figure 4 is a sectional view taken along line 4—4 of Figure 1;

Figure 5 is a sectional view taken along line 5—5 of Figure 2; indicating the mechanism used for controlling the adjustment of the wings and their nesting or spacing apart;

Figure 6 is a sectional elevation taken along line 6—6 of Figure 1, showing the mechanism indicated in Figure 5, and the engine and propeller tilting mechanism.

Similar reference characters refer to similar parts throughout the drawings.

The structure of the airplane consists of a body or cabin portion 1 having an elongated cigar-like shape with its tail section 2 converging and mounted with controlling fins 3 and rudder 20. The nose or front portion 4 is preferably semi-circularly rounded as indicated. The interior 5 of the cabin follows conventional lines, modified to suit the requirements of the special mechanism used and installed within it to operate the wings.

The wings termed auxiliary and main wings are mounted on the sides of the cabin and arranged in pairs and numbered 6 and 7 respectively. They are relatively narrow with their front portions 8 and 9 respectively rounded and slightly larger than the rear portions 10 and 11 respectively, which are also semi-circularly rounded. These rear portions of wings 7 are supplemented with triangular fins 12 extending laterally out therefrom. The wings are of curved section as indicated in Figures 3 and 4 and adapted to nest against each other when brought together. The propellers 13 are mounted on their engines 14 and positioned under the bottom wings close to their front ends by brackets 39 and tilted through shaft 53, gearing 50 and 51 when the motor 52 is started. Landing wheels 15 mounted on supports 45 and trailer wheel 16 of somewhat conventional form are provided under the cabinet structure to take up the landing stresses and strains. The mechanism for controlling the position of the wings 6 consists of cradles 17 and 18 which slide in slots 38 respectively which support the shaft 19 which passes into the cabin space 5 to be operated through the gearing 21 and 22 connected to the cradles. The inner sides of the wings are equipped with pins and rollers 25 and 26; and 27 and 28 respectively, front and back as shown. The pins travel in arcuate guides 29 and 30 respectively when the wings are rotated on their shaft 19. The shaft permits the wings to rotate therewith in fixed relation thereto. The shaft raises the wings through the operation of the spur gearing 21 and gear rack 22, when their connecting motor 31 is started;

while the motor 32 actuates the gearing 23 and 24 to rotate same. The arcuate guides are secured to plates 33 and 34, which slide in the Z-pieces 35 attached to the wall of the cabin therefor. The operation of the mechanism proceeds as follows; the motor 31 is started through a reversible switch and rotates the gearing 21 and through the rack gear 22 raises the shaft 19 carrying the wings vertically with it, until the end of the travel is reached, or any other point that the user may select. At such points, the user starts the second motor 32 and tilts the wings to the desired amount. This is performed by the rotation of the shaft and gearing 23 and 24 acting upon same. The limit of travel is controlled by the construction of the guides. The purpose of this operation is to lift the upper wings above the lower wings and provide more effective wing surface for the airplane at take-up and thereby increase its lifting power and lower the time of raising into the air. At the same time the wings are tilted to engage the wind at an angle and increase the lifting action. This produces a quick take-off. When travelling through the air under normal conditions, the wings are closed or nested against one another and produce a single pair of wings which create less frictional resistance to travel of the airplane. When the landing is made ready for, the operator uses the motor 31 for separating the wings that were nested, and increases the effective area of the wings to produce a slower landing. The wings are tilted through the rotation of the shaft by the motor 32 to suit the landing, as the operator deems best.

Since the operator has control of the surface area of the wings to be presented to the wind as the airplane flies, he can adjust them to suit any wind conditions that he may meet, and at the same time modify the speed of the device. The shifting of the wings tends to lessen the opportunity for the accumulation of ice thereon in wintry weather. The propellers with their engines may be tilted up or down in an angular position to accelerate or retard the take-off or landing of the airplane.

While but one general form of the invention is shown in the drawings, it is not desired to limit this application to this particular form or in any other way otherwise than limited by the scope thereof, as it is appreciated that other forms could be made that would use the same principles and come within the scope of the appended claims.

Having thus described the invention, what is claimed is:

1. An airplane comprising in combination a cabin portion having an elongated cigar-like shape with its tail section converging, controlling fins and rudder mounted on the converging portion, relatively narrow main wings mounted on the sides of the cabin portion having their front portions rounded semi-circularly, supplementary triangular fins mounted on the rear portions of the wings and extending laterally therefrom, auxiliary wings adapted to nest over the said wings and move to or away from same, said auxiliary wings being tiltable when separated from the first mentioned wings so as to control the flow of air over the main wings in predetermined directions and amount, and mechanism mounted in the cabin portion and attached to the auxiliary wings for operating same in vertical and tilting manners.

2. An airplane comprising in combination, a cabin or body portion having an elongated cigar-shape with its tail section elongated and converging, a pair of main stationary wings on each side of the said portion having an elongated longitudinally and rounded form and mounted adjacent to the body near the central portion thereof and parallel thereto, auxiliary wings movable against and away from the main wings and adapted to nest over same, and tilt at various angles when spaced away therefrom, means for moving the auxiliary wings in a vertical and tilting manner to control the air flow over the main wings, said means being mounted on and actuable from the body portion, and engines for operating the plane under and away from the main wings attached to the said body portion.

LINDLEY W. MOORE.